United States Patent
Zhao et al.

(10) Patent No.: US 9,525,577 B2
(45) Date of Patent: Dec. 20, 2016

(54) COMMUNICATION METHOD AND USER EQUIPMENT IN MIXED CELLULAR AND D2D NETWORK

(71) Applicant: Telefonaktiebolaget L M Ericsson (publ), Stockholm (SE)

(72) Inventors: Zhenshan Zhao, Beijing (CN); Qianxi Lu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 14/387,567

(22) PCT Filed: Nov. 20, 2013

(86) PCT No.: PCT/SE2013/051366
§ 371 (c)(1),
(2) Date: Sep. 24, 2014

(87) PCT Pub. No.: WO2014/189424
PCT Pub. Date: Nov. 27, 2014

(65) Prior Publication Data
US 2016/0156494 A1 Jun. 2, 2016

(30) Foreign Application Priority Data
May 21, 2013 (CN) ................ PCT/CN2013/075977

(51) Int. Cl.
*H04L 27/26* (2006.01)
*H04B 7/26* (2006.01)
(Continued)

(52) U.S. Cl.
CPC ......... *H04L 27/2607* (2013.01); *H04B 7/2656* (2013.01); *H04L 5/0007* (2013.01); *H04W 56/0045* (2013.01); *H04W 84/18* (2013.01)

(58) Field of Classification Search
CPC .................................................. H04L 27/2607
(Continued)

(56) References Cited

U.S. PATENT DOCUMENTS 6,904,032 B2 * 6/2005 Cain .................... H04B 7/0491
370/337
2009/0122731 A1 * 5/2009 Montojo ............... H04L 5/1484
370/280

(Continued)

FOREIGN PATENT DOCUMENTS

WO   WO 2012/091645   7/2012

OTHER PUBLICATIONS

PCT International Preliminary Report on Patentability for International application No. PCT/SE2013/051366 Nov. 24, 2015.

(Continued)

*Primary Examiner* — Melvin Marcelo
*Assistant Examiner* — Peter G Solinsky
(74) *Attorney, Agent, or Firm* — Baker Botts, LLP

(57) ABSTRACT

The present disclosure discloses a communication method performed by a User Equipment (UE) (301) in a mixed cellular and Device-to-Device (D2D) network (300) and the UE. The method comprises the step of communicating in the mixed network according to a radio frame structure, wherein the radio frame structure comprises at least one D2D subframe having a Guard Period (GP) at an end or at a beginning of the D2D subframe.

14 Claims, 10 Drawing Sheets

(51) Int. Cl.
*H04W 56/00* (2009.01)
*H04L 5/00* (2006.01)
*H04W 84/18* (2009.01)

(58) Field of Classification Search
USPC .......................................................... 370/476
See application file for complete search history.

(56) References Cited

U.S. PATENT DOCUMENTS

| | | | | |
|---|---|---|---|---|
| 2011/0255450 | A1* | 10/2011 | Wang | H04W 72/0493 370/280 |
| 2012/0077510 | A1* | 3/2012 | Chen | H04W 28/26 455/452.1 |
| 2013/0142268 | A1* | 6/2013 | Gao | H04W 72/04 375/252 |
| 2013/0170387 | A1* | 7/2013 | Wang | H04W 4/005 370/252 |
| 2013/0223398 | A1* | 8/2013 | Li | H04W 72/085 370/329 |
| 2014/0016574 | A1* | 1/2014 | Seo | H04W 76/023 370/329 |
| 2014/0126432 | A1* | 5/2014 | Wang | H04B 7/2656 370/280 |
| 2014/0293968 | A1* | 10/2014 | Ebrahimi Tazeh Mahalleh | H04W 56/001 370/336 |
| 2015/0103702 | A1* | 4/2015 | Lahetkangas | H04L 5/0044 370/280 |
| 2015/0215979 | A1* | 7/2015 | Nan | H04W 76/023 370/329 |
| 2015/0358801 | A1* | 12/2015 | Seo | H04L 5/00 370/329 |
| 2016/0029333 | A1* | 1/2016 | Seo | H04L 27/2655 370/350 |
| 2016/0044634 | A1* | 2/2016 | Seo | H04W 72/005 370/312 |
| 2016/0073392 | A1* | 3/2016 | Byun | H04W 72/048 370/280 |

OTHER PUBLICATIONS

PCT International Search Report for International application No. PCT/SE2013/051366 Mar. 12, 2014.
3rd Generation Partnership Project; Technical Specification Group Radio Access Network; Evolved Universal Terrestrial Radio Access (E-UTRA); Physical Channels and Modulation (Release 10), 2011.
Australian Government, IP Australia, Patent Examination Report No. 1, Application No. 2013390061, Date of Issue: May 6, 2016.

* cited by examiner

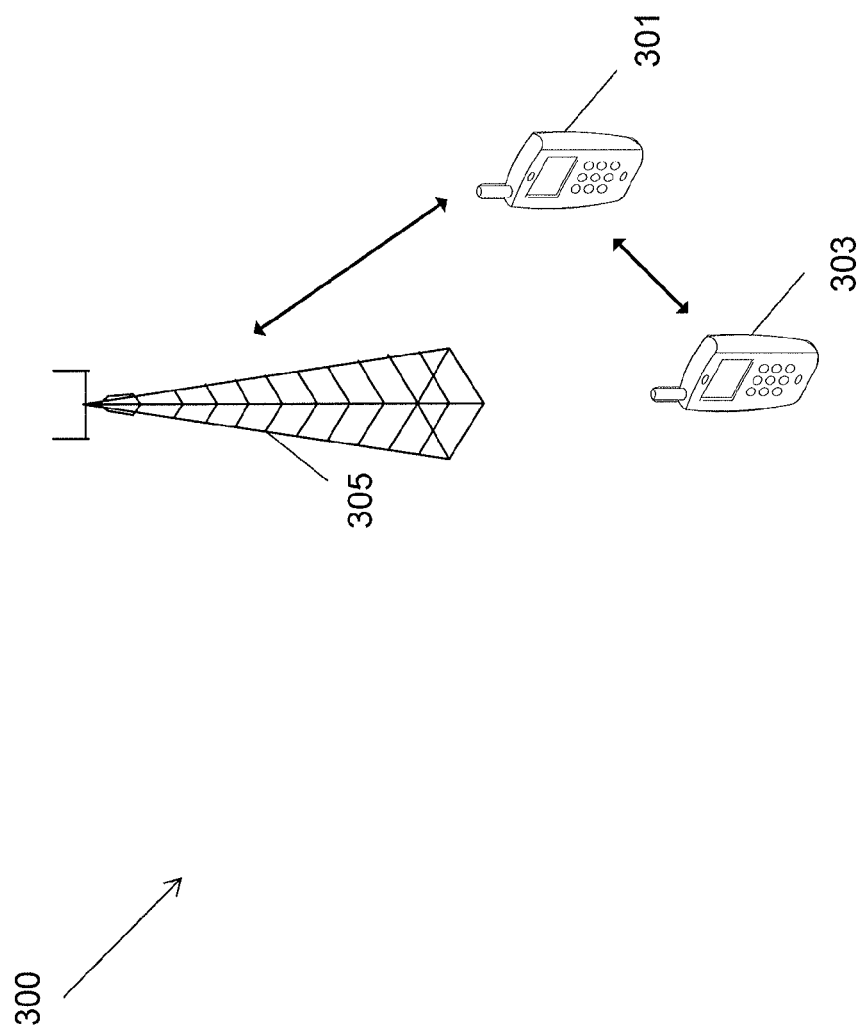

COMMUNICATION METHOD AND USER EQUIPMENT IN MIXED CELLULAR AND D2D NETWORK

PRIORITY

This nonprovisional application is a U.S. National Stage Filing under 35 U.S.C. §371 of International Patent Application Serial No. PCT/SE2013/051366, filed Nov. 20, 2013, and entitled "Communication Method and User Equipment in Mixed Cellular and D2D Network" and International Patent Application Serial No. PCT/CN2013/075977, filed May 21, 2013.

TECHNICAL FIELD

The present disclosure generally relates to the technical field of mobile communication systems, and particularly, to a communication method performed by a User Equipment (UE) in a mixed cellular and Device-to-Device (D2D) network and the UE.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Recent developments of the 3rd Generation Partnership Project (3GPP) Long Term Evolution (LTE) facilitate accessing local Internet Protocol (IP)-based services in various places, such as at home, office, or public hot spots, or even in outdoor environments. One of the important use cases for the local IP access and local connectivity involves a so-called D2D communication mode, wherein UEs in close proximity (typically less than a few tens of meters, but sometimes up to a few hundred meters) of each other communicate with each other directly.

Because D2D UEs are much closer to each other than cellular UEs that have to communicate via at least one cellular access point (e.g., an evolved NodeB (eNB)), the D2D communication enables a number of potential gains over the traditional cellular technique, including capacity gain, peak rate gain, and latency gain.

The capacity gain may be achieved, for example, by reusing radio resources (e.g., Orthogonal Frequency Division Multiplexing (OFDM) resource blocks) between D2D and cellular communications and by reducing the number of links between UEs from two to one and accordingly reducing the radio resources required for one link. The peak rate gain directly results from the relatively short distance between D2D UEs and the potentially favorable propagation condition therebetween. The latency gain is also a direct result of the single relatively short link between D2D UEs.

FIG. 1 illustrates an example of a mixed cellular and D2D network 100, wherein UE 101 is a cellular UE which communicates via an eNB 103 using a cellular link 105, whereas UE 108 and UE 110 are D2D UEs which communicate with each other directly using a D2D UE link 115. In such a mixed cellular and D2D network 100, D2D communications share radio resources with cellular communications. A Time Division Duplex (TDD) is used as the duplex scheme for the bi-directional D2D communications in FIG. 1.

A pure cellular system may comprise only the UE 101 and the eNB 103 in FIG. 1. It does not comprise the UE 108 and UE 110 which communicate using the D2D UE link 115. For a pure cellular system using a TDD scheme to work properly, a Guard Period (GP) is configured at the transition between DownLink (DL) communications and UpLink (UL) communications, as illustrated in FIG. 2. A GP may be described as a time interval where no radio transmission may occur. The purpose of the GP is to protect adjacent data from transmission overlap due to propagation time of the data, i.e. to avoid interference. A GP length is related to a cell size. More specific, the GP is larger than twice the transmission delay for a signal transmitted between the eNB and the UE 101, i.e. the delay for a transmission from the eNB 103 to the UE 101 or the delay for the transmission from the UE 101 to the eNB 103. The GP exists only in TDD system which is used to handle the transmission delay from the eNB 103 to the UE 101 (i.e. DL) and the Timing Advance (TA) of the UE 101 to transmit (i.e. UL). Thus, the GP is between a downlink and an uplink transition. With the GP positioned between the Downlink Pilot TimeSlot (DwPTS) and the Uplink Pilot TimeSlot (UpPTS), the DL data transmitted from the eNB 103 can be fully received by the UE 101 before the UL data is sent from the UE to the eNB 103 with a TA. A TA is used by the UE 101 to transmit data. Different UEs have different TAs so that their signals can be time aligned at the eNB 103. The transmission delay seen in FIG. 2 is the delay of the data transmitted from the eNB 103 to the UE 101.

The time instance when the DL data is transmitted from the eNB 103 is indicated as eNB TX in FIG. 2 and the time instance when the DL data is received by the UE 101 is indicated as UE RX in FIG. 2. The time instance when the UL data is transmitted from the UE 101 to the eNB 103 is indicated as UE TX and the time instance when the UL data is received by the eNB 103 is indicated as eNB RX in FIG. 2. TX refers to transmitting and RX refers to receiving.

The DwPTS mentioned above is a field which carries synchronization, user data and the downlink control channel for transmitting scheduling and control information. The UpPTS is a field which is used for transmitting a physical random access channel and a sounding reference signal.

The term DL mentioned above refers to communication in the direction from an eNB 103 to a UE 101, and the term UL refers to communication in the direction from a UE 101 to an eNB 103.

Transmissions in the mixed cellular and D2D network may utilize a frame and subframe structure when managing the data that needs to be transmitted. A frame may be divided into a number of subframes. A subframe may be of a certain length, it may comprise a number of slots etc. A cellular subframe may be a subframe used to carry data between the UE and the eNB. A D2D subframe may be a subframe used to carry data between two UE's, i.e. between D2D UEs. A subframe may comprise at least one OFDM symbol. A D2D subframe transmitted by a UE (to another UE) is referred to as a D2D TX subframe. A D2D subframe received by a UE (from another UE) is referred to as a D2D RX subframe.

In the mixed cellular and D2D network 100, there exist other communication transitions than the DL/UL transition. From the perspective of one UE, the communication transition may additionally occur between a cellular subframe and a D2D TX subframe, between a cellular subframe and a D2D RX subframe, or between a D2D TX subframe and a D2D RX subframe. At these transitions, overlap as described above might as well happen, which can affect data transmission/reception.

SUMMARY

An object of the present disclosure is to provide solutions to guarantee that a UE in the mixed cellular and D2D network can work properly at communication transitions between a cellular subframe and a D2D TX subframe, between a cellular subframe and a D2D RX subframe, or between a D2D TX subframe and a D2D RX subframe.

According to a first aspect of the disclosure, there is provided a communication method performed by a UE in a mixed cellular and D2D network. The UE communicates in the mixed network according to a radio frame structure. The radio frame structure comprises at least one D2D subframe having a GP at an end or at a beginning of the D2D subframe.

According to a second aspect of the disclosure, there is provided a UE in a mixed cellular and D2D network. The UE comprises a transceiver configured to perform transmission and reception in the mixed network according to a radio frame structure. The radio frame structure comprises at least one D2D subframe having a GP at an end or at a beginning of the D2D subframe.

By using the method and UE according to the first and second aspects of the disclosure, a UE in a mixed cellular and D2D network can work properly at various transitions. When the UE works properly, it knows exactly what to do at various transitions because of the GP being defined at the beginning and/or end of the D2D subframe. In other words, since the UE knows the location and the length of the GP, the UE can only receive symbols carrying data. Without the GP, the UE will not know what to do at various transitions and it may result in that the UE discards cellular data, D2D data etc. In other words, at a subframe transmission, the UE does not know where the end of the first subframe is or where the beginning of the second subframe is due to that there is no GP. As a result of this, the UE does not know whether to discard the cellular data or the D2D data if there is an overlap during the subframe transmission.

BRIEF DESCRIPTION OF THE DRAWINGS

The above and other objects, features and advantages of the present disclosure will become apparent from the following descriptions of embodiments of the present disclosure with reference to the drawings, in which:

FIG. 3 is a schematic block diagram illustrating embodiments of a mixed cellular and D2D network according to the present disclosure;

DETAILED DESCRIPTION

Figure 1:
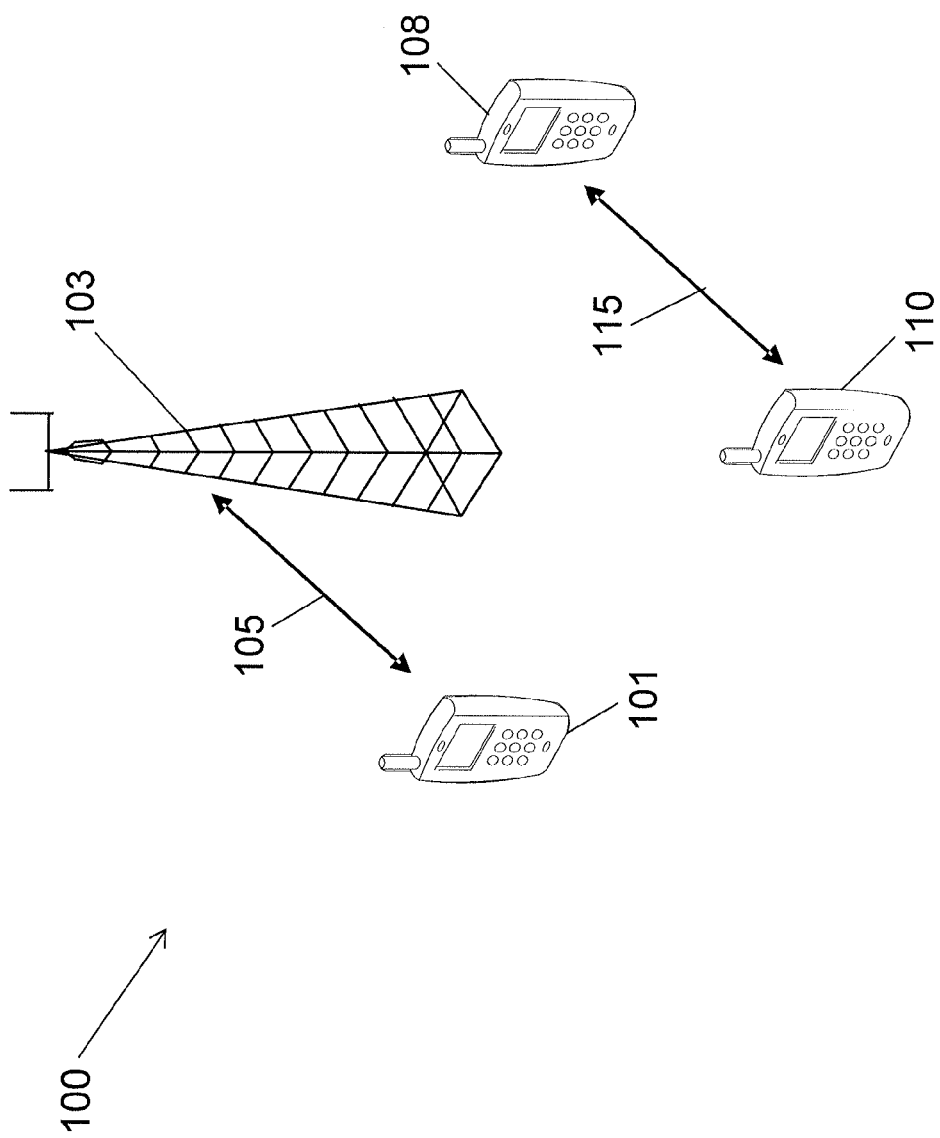
FIG. 1 is a diagram illustrating a mixed cellular and D2D network.
Figure 2:
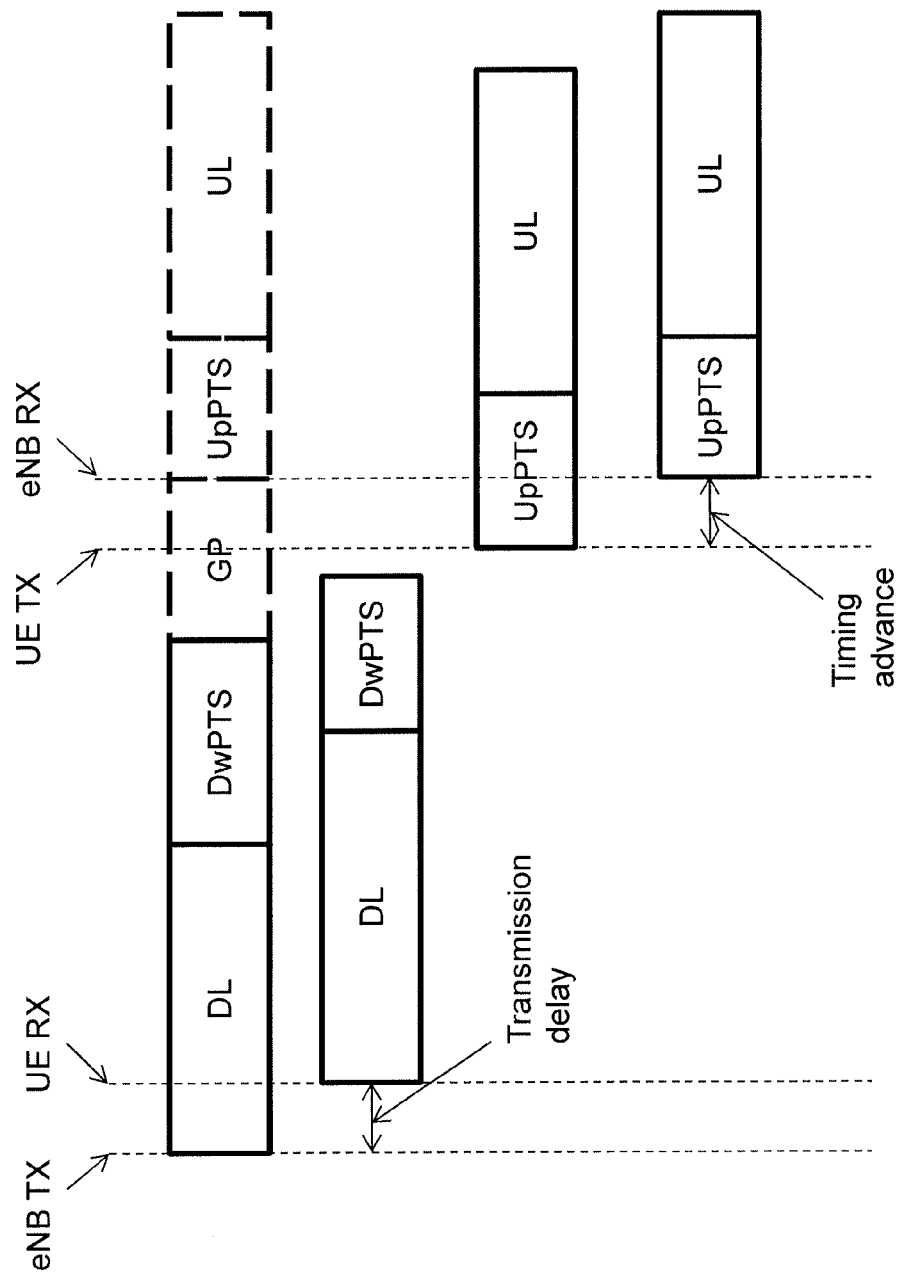
FIG. 2 is a diagram illustrating a solution for a UE to work properly at a transition between DL and UL communications in a pure cellular system using a TDD scheme.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

FIG. 3 is a schematic block diagram illustrating embodiments of a mixed cellular and D2D network 300 according to the present disclosure. The mixed cellular and D2D network 300 comprises an UE 301 which can transmit and receive data to and from a D2D UE 303. The mixed cellular and D2D network 300 further comprises an eNB 305 which can transmit and receive data to and from the UE 301. Thus, the UE 301 can transmit and receive data to and from both the eNB and the D2D UE 303. The UE 301 and the D2D UE 303 may each be a device by which a subscriber may access services offered by an operators network and services outside operator's network to which the operators radio access network and core network provide access, e.g. access to the Internet. The UE 301 and the D2D UE 303 may each be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC).

As mentioned in the above, a UE 301 operating in the mixed cellular and D2D network 300 may transmit data not only to an eNB 305 but also to its corresponding D2D UE 303, e.g. a D2D receiving (RX) UE. Accordingly, two TAs may exist, denoted as TA_cell and TA_D2D, for transmitting data to the eNB 305 and to the D2D UE 303 in advance, respectively. The acquisition of TA_cell and TA_D2D can be according to any known or heretofore unknown criteria. For example, the TA_cell and the TA_D2D can be determined in a manner that all the UEs' 301 data arrives at the eNB 305 or at the D2D UE 303 at the same time. The UE 301 may be referred to as a TX UE in an embodiment where the UE 301 transmits data to the eNB 305 and as a D2D TX UE when the UE 301 transmits data to the D2D UE 303 when it is a D2D RX UE. The UE 301 may be referred to as a D2D RX UE in an embodiment where the UE 301 receives data from the D2D UE 303 when the D2D UE 303 is a D2D TX UE. The UE 301 may be referred to as a RX UE in an embodiment where the UE 301 receives data from the eNB 305. In other words, the UE 301 may be both a transmitting and receiving UE. The D2D UE 303 may also be referred to as a D2D RX UE in an embodiment where it receives data from the UE 301 when the UE 301 is a D2D TX UE. The D2D UE 303 may be referred to as a D2D TX UE in an embodiment where it transmits data to the UE 301 when the UE 301 is a D2D RX UE. In other words, the D2D UE 303 may be both a transmitting and a receiving D2D UE 303.

Figure 4B:
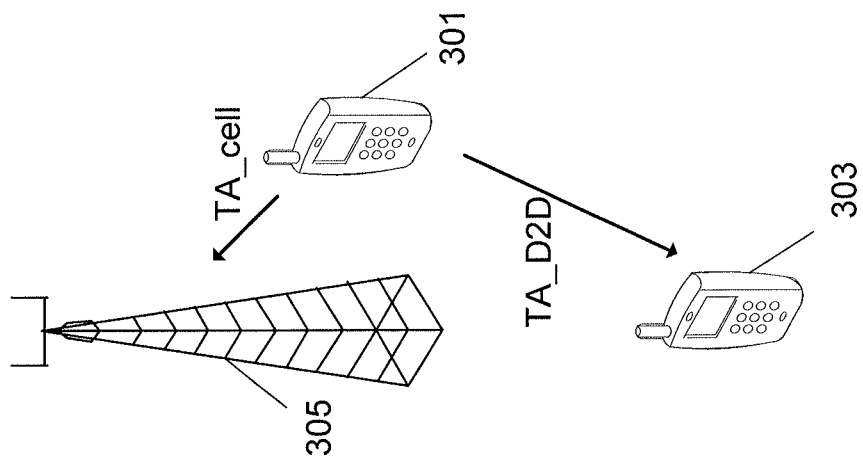
FIGS. 4a and 4b are diagrams illustrating scenarios wherein a D2D RX UE is closer to a D2D TX UE than an eNB is and the eNB is closer to the D2D TX UE than the D2D UE.
Figure 4A:
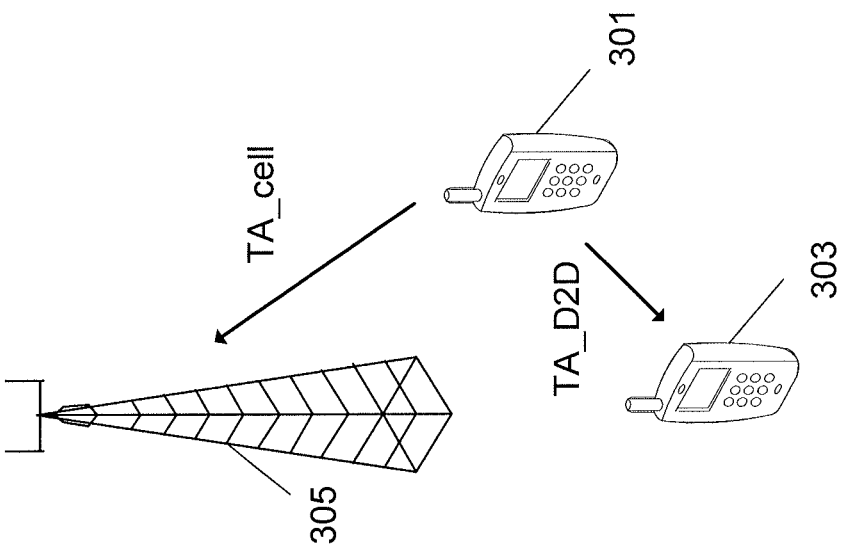

Sometimes, the D2D UE 303 is closer to the UE 301 than the eNB 305 is, and sometimes the eNB 305 is closer to the UE 301 than the D2D UE 303. In FIGS. 4*a* and 4*b*, these two cases are illustrated, respectively. The term closer refers to a distance. When the D2D UE 303 is closer to the UE 301 than the eNB 305, the term closer refers to that the distance between the D2D UE 303 and the UE 301 is shorter than the distance between the UE 301 and the eNB 305. Correspondingly, the distance between the UE 301 and the eNB 305 is shorter than the distance between the UE 301 and the D2D UE 303 when it is written that the eNB 305 is closer to the UE 301 than the D2D UE 303.

In the following, six transition scenarios will be discussed to illustrate how a UE 301 in a mixed cellular and D2D network 300 can work properly in different transition scenarios according to the present disclosure.

In the first scenario, a UE 301 firstly transmits a cellular subframe with a TA_cell to the eNB 305 and then transmits a D2D subframe with a TA_D2D to the D2D UE 303. The TA_cell may be longer than or equal to the TA_D2D, as illustrated in FIG. 5*a*, or the TA_cell may be shorter than the TA_D2D, as illustrated in FIG. 5*b*.

Figure 5:
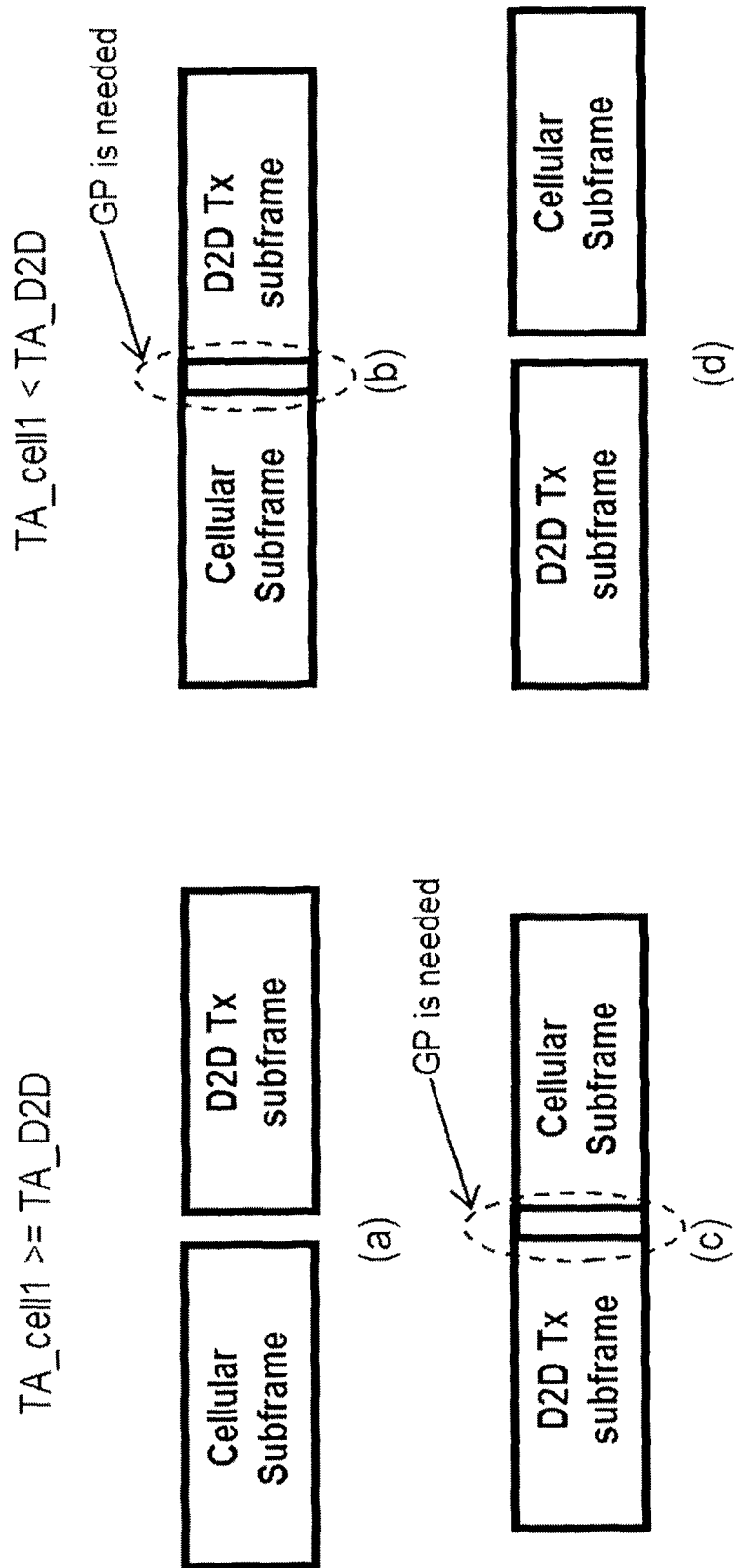
FIGS. 5a-5d are diagrams illustrating different cases of a transition between a cellular subframe and a D2D TX subframe.

In the former case in FIG. 5*a*, there is no overlap between the cellular and D2D subframes. That is, the cellular subframe can be completely transmitted by the UE 301 before the UE 301 starts to transmit the D2D subframe with the TA_D2D to the D2D UE 303. Therefore, the UE 301 can work properly at this transition and no special measure shall be applied to handle this transition.

In the latter case in FIG. 5*b*, OFDM symbols at the beginning of the D2D subframe would overlap with symbols at the end of the cellular subframe. For the transmission of the cellular subframe not to be affected by the transmission of the D2D subframe, a GP may be configured at the beginning of the D2D subframe. Since the cellular subframe is not affected by the transmission of the D2D subframe due to configuration of the GP, the risk of losing data which is transmitted in the mixed cellular and D2D network 300 is reduced.

In the second scenario, a UE 301 firstly transmits a D2D subframe with a TA_D2D to the D2D UE 303 and then transmits a cellular subframe with a TA_cell1 to the eNB 305. The TA_cell1 may be longer than or equal to the TA_D2D, as seen in FIG. 5*c*, or the TA_cell1 may be shorter than the TA_D2D, as illustrated in FIG. 5*d*.

In the former case in FIG. 5*c*, OFDM symbols at the end of the D2D subframe would overlap with symbols at the beginning of the cellular subframe. For the transmission of the cellular subframe not to be affected by transmission of the D2D subframe, a GP may be configured at the end of the D2D subframe. Since the cellular subframe is not affected by the transmission of the D2D subframe due to configuration of the GP, the risk of losing data which is transmitted in the mixed cellular and D2D network 300 is reduced.

In the latter case in FIG. 5*d*, there is no overlap between the D2D and cellular subframes. That is, the D2D subframe can be completely transmitted by the UE 301 before the UE 301 starts to transmit the cellular subframe with the TA_cell to the eNB 305. Therefore, the UE 301 can work properly at this transition and no special measure shall be applied to handle this transition.

In the third scenario, a UE 301 firstly transmits a cellular subframe with a TA_cell2 to the eNB 305 and then serves as a D2D RX UE to receive a D2D subframe from a D2D TX UE such as e.g. the D2D UE 303. The D2D subframe is transmitted from the D2D TX UE 303 with a TA_D2D, and undergoes a transmission delay, T_TransDelay, from the D2D TX UE 303 to the D2D RX UE 301. The TA_cell2 may be longer than or equal to the TA_D2D minus the T_TransDelay, as illustrated in FIG. 6*a* or it may be shorter than the TA_D2D minus the T_TransDelay, as illustrated in FIG. 6*b*.

Figure 6:
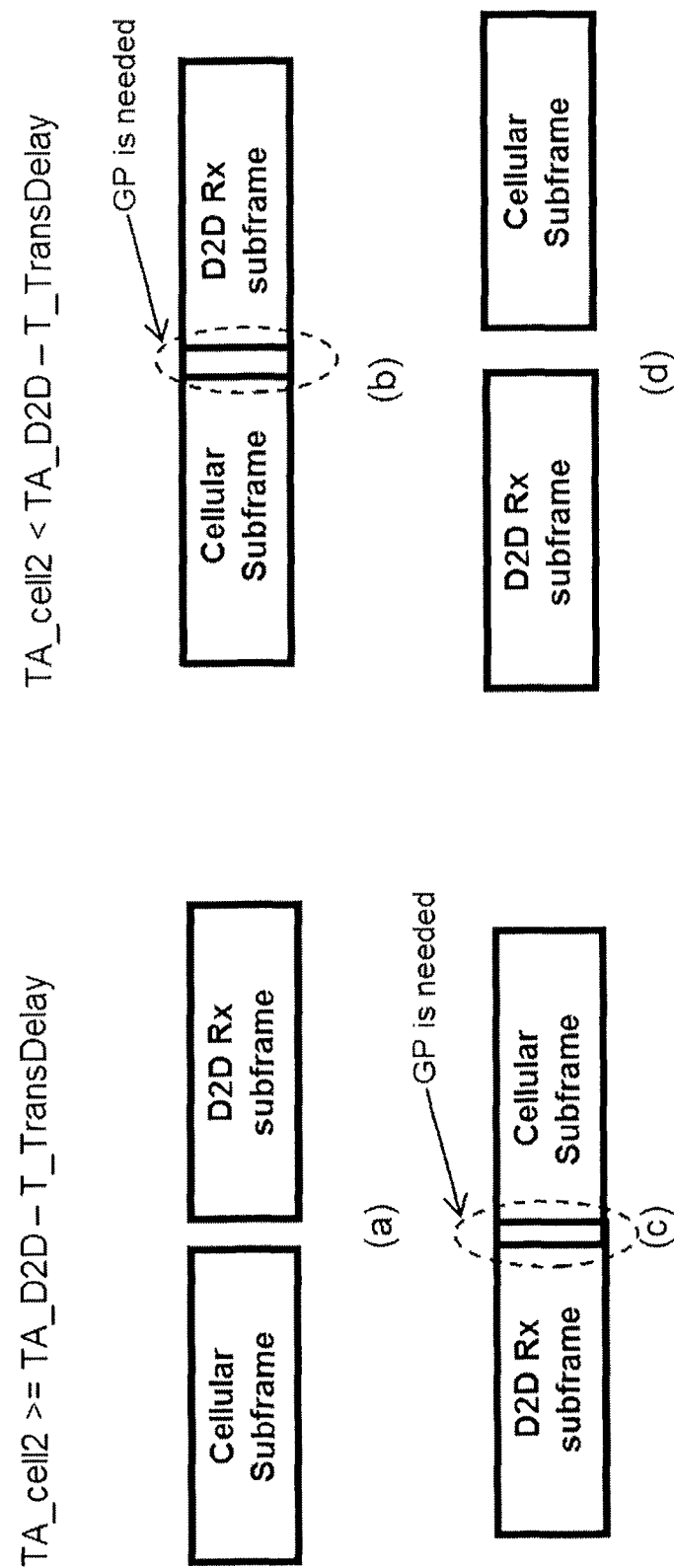
FIGS. 6a-6d are diagrams illustrating different cases of a transition between a cellular subframe and a D2D RX subframe.

In the former case in FIG. 6*a*, there is no overlap between the cellular and D2D subframes. That is, the cellular subframe can be completely transmitted by the UE 301 before the D2D subframe arrives at the D2D RX UE 303. Therefore, the UE 301 can work properly at this transition and no special measure shall be applied to handle this transition.

In the latter case in FIG. 6*b*, OFDM symbols at the beginning of the D2D subframe would overlap with symbols at the end of the cellular subframe. To avoid losing data of the D2D subframe, a GP may be configured at the beginning of the D2D subframe.

In the fourth scenario, a UE 301 firstly serves as a D2D RX UE to receive a D2D subframe and then transmits a cellular subframe with a TA_cell2 to the eNB 305. The D2D subframe is transmitted from a D2D TX UE, e.g. the D2D UE 303, with a TA_D2D, and undergoes a transmission delay, T_TransDelay, from the D2D TX UE 303 to the D2D RX UE 301. The TA_cell2 may be longer than or equal to the TA_D2D minus the T_TransDelay, as illustrated in FIG. 6*c*, or may be shorter than the TA_D2D minus the T_TransDelay, as illustrated in FIG. 6*d*.

In the former case in FIG. 6*c*, OFDM symbols at the end of the D2D subframe would overlap with symbols at the beginning of the cellular subframe. To avoid losing data of the D2D subframe, a GP may be configured at the end of the D2D subframe.

In the latter case in FIG. 6*d*, there is no overlap between the cellular and D2D subframes. That is, the D2D subframe can be completely received by the UE 301 before the UE 301 starts to transmit the cellular subframe. Therefore, the UE 301 can work properly at this transition and no special measure shall be applied to handle this transition.

Figure 7:
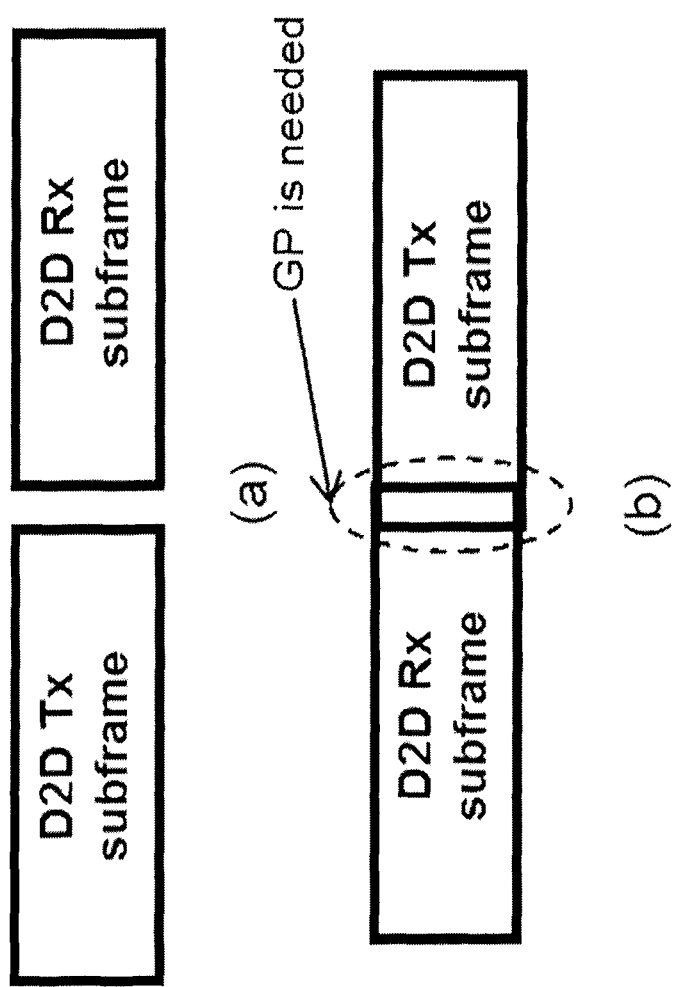
FIGS. 7a and 7b are diagrams illustrating different cases of a transition between a D2D TX subframe and a D2D RX subframe.

In the fifth scenario, a UE 301 firstly serves as a D2D TX UE to transmit a D2D subframe to the D2D 303 and then serves as a D2D RX UE to receive a D2D subframe from the D2D UE 303. As illustrated in FIG. 7*a*, in this scenario, there is no overlap between the D2D TX and D2D RX subframes, due to the transmission delay of the D2D RX subframe from the D2D TX UE 301 to the D2D RX UE 303 and the TA for transmitting the D2D TX subframe. Therefore, the UE 301 can work properly at this transition and no special measure shall be applied to handle this transition.

In the sixth scenario, a UE 301 firstly serves as a D2D RX UE to receive a D2D subframe and then serves as a D2D TX UE to transmit a D2D subframe. As illustrated in FIG. 7*b*, in this scenario, OFDM symbols at the end of the D2D RX subframe would overlap with symbols at the beginning of the D2D TX subframe. The overlap may be due to different conditions. There may be two possible transmission timings for D2D subframes: using DL timing or using UL TA. Correspondingly there are two receiving timings for D2D subframes: using DL timing or using UL TA. The overlap is also related to the position of the UE 301 and D2D UE 303 (the one which is closest to the eNB 305). However, in general there is an overlap at the D2D RX to D2D TX transition. To avoid losing data of D2D subframes, a GP may be configured at the beginning of the D2D TX subframe, or at the end of the D2D RX subframe, or both of them.

As will be appreciated by those skilled in the art, to handle the third and fourth transition scenarios, the D2D TX UE needs to be explicitly or implicitly notified of the TA_cell2 and T_TransDelay by the D2D RX UE.

Figure 8:
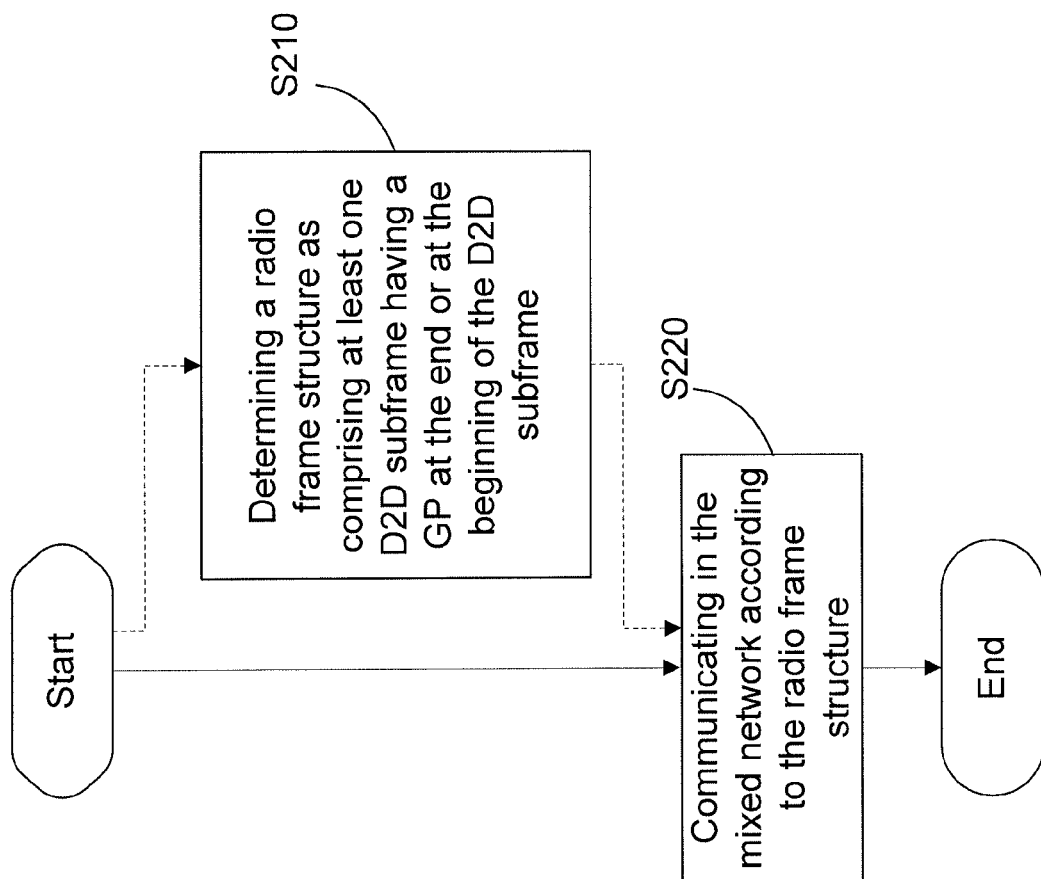
FIG. 8 is a flowchart illustrating a communication method for guaranteeing a UE to work properly at the transitions illustrated in FIGS. 5-7.

To sum up, to guarantee that a UE 301 in the mixed cellular and D2D network 300 can work properly at the above mentioned transition scenarios, a communication method performed by a UE 301 in a mixed cellular and D2D network 300 may be provided. As illustrated in FIG. 8, the method includes a step S220, where the UE e.g. 301 communicates in the mixed cellular and D2D network 300 according to a radio frame structure, wherein the radio frame structure comprises at least one D2D subframe having a Guard Period, GP, at an end or at a beginning of the D2D subframe. Optionally, before step S220, the method may further include a step S210, where the UE 301 may determine the radio frame structure as comprising at least one D2D subframe having a GP at the end or at the beginning of the D2D subframe Preferably, the radio frame structure may comprise a D2D subframe having a GP at its beginning, in a case where the D2D subframe is to be transmitted after a cellular subframe and a timing advance for transmitting the cellular subframe, TA_cell, is shorter than a timing advance for transmitting the D2D subframe, TA_D2D.

Preferably, the radio frame structure may be determined as comprising a D2D subframe having a GP at its beginning, in a case where the D2D subframe is to be transmitted after a cellular subframe and a timing advance for transmitting the cellular subframe, TA_cell, is shorter than a timing advance for transmitting the D2D subframe, TA_D2D.

Preferably, the radio frame structure may comprise a D2D subframe having a GP at its end, in a case where a cellular subframe is to be transmitted, after the D2D subframe and a timing advance for transmitting the cellular subframe, TA_cell, is longer than or equal to a timing advance for transmitting the D2D subframe, TA_D2D.

Preferably, the radio frame structure may be determined as comprising a D2D subframe having a GP at its end, in a case where a cellular subframe is to be transmitted after the D2D subframe and a timing advance for transmitting the cellular subframe, TA_cell, is longer than or equal to a timing advance for transmitting the D2D subframe, TA_D2D.

Preferably, the radio frame structure may comprise a D2D subframe having a GP at its beginning, in a case where the D2D subframe is to be received after a cellular subframe is transmitted, and a timing advance for transmitting the cellular subframe, TA_cell, is shorter than a timing advance for transmitting the D2D subframe, TA_D2D, minus a transmission delay of the D2D subframe from D2D TX to D2D RX, T_TransDelay.

Preferably, the radio frame structure may be determined as comprising a D2D subframe having a GP at its beginning, in a case where the D2D subframe is to be received after a cellular subframe is transmitted and a timing advance for transmitting the cellular subframe, TA_cell, is short than a timing advance for transmitting the D2D subframe, TA_D2D, minus a transmission delay of the D2D subframe from D2D Tx to D2D Rx, T_TransDelay.

Preferably, the radio frame structure may comprise a D2D subframe having a GP at its end, in a case where a cellular subframe is to be transmitted, after the D2D subframe is received, and a timing advance for transmitting the cellular subframe, TA_cell, is longer than or equal to a timing advance for transmitting the D2D subframe, TA_D2D, minus a transmission delay of the D2D subframe from D2D TX to D2D RX, T_TransDelay.

Preferably, the radio frame structure may be determined as comprising a D2D subframe having a GP at its end, in a case where a cellular subframe is to be transmitted after the D2D subframe is received and a timing advance for transmitting the cellular subframe, TA_cell, is longer than or equal to a timing advance for transmitting the D2D subframe, TA_D2D, minus a transmission delay of the D2D subframe from D2D Tx to D2D Rx, T_TransDelay.

Preferably, the radio frame structure may comprise a first D2D subframe followed by a second D2D subframe with a GP at the end of the first D2D subframe and/or a GP at the beginning of the second D2D subframe, in a case where the second D2D subframe is to be transmitted, after the first D2D subframe is received.

Preferably, the radio frame structure may be determined as comprising a first D2D subframe followed by a second D2D subframe with a GP at the end of the first D2D subframe and/or a GP at the beginning of the second D2D subframe, in a case where the second D2D subframe is to be transmitted after the first D2D subframe is received.

The configuration of GP at the beginning and/or end of the D2D subframe can be explicitly or implicitly signaled from one UE to another UE, e.g. from the UE 301 when it is a D2D TX UE to the D2D UE 303 when it is a D2D RX UE. Additionally, this signaling can be assisted by the network, e.g. the eNB 305. Alternatively, the UE, e.g. the D2D RX UE may blindly detect the GP by measuring the signal strength of received OFDM symbols and determining blank symbols (whose signal strength is at the same level as interference) as the GP.

Figure 9:
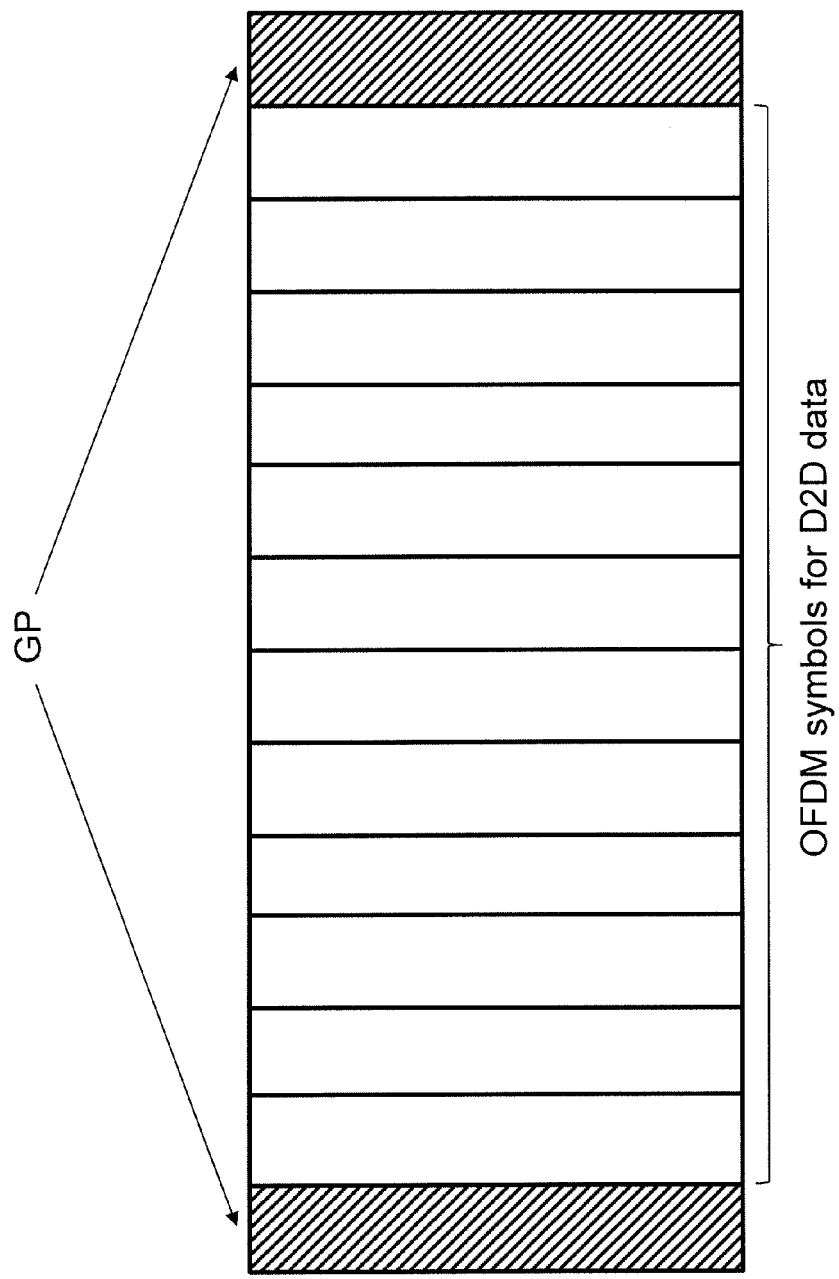
FIG. 9 is a diagram illustrating an example structure of a D2D subframe according to the present disclosure.

A duration of one OFDM symbol may be large enough for the GP at the beginning and/or end of the D2D subframe. Taking the normal Cyclic Prefix (CP) case as an example, one subframe includes 14 OFDM symbols. Each symbol has a duration of about 71 μs, which corresponds to 21 km. This is large enough for D2D communications which typically occur between UEs in close proximity of each other. FIG. 9 illustrates an example structure of a D2D subframe. FIG. 9 illustrates two GPs represented by the hatched rectangles. Each GP has a duration of one OFDM symbol and each GP are respectively configured at the beginning and end of the D2D subframe. Each white rectangle in FIG. 9 represents an OFDM symbol for D2D data. In total, FIG. 9 illustrates 12 OFDM symbols for D2D data and 2 GPs.

In the following, a structure of a UE 301 according to the present disclosure will be given with reference to FIG. 10.

Figure 10:
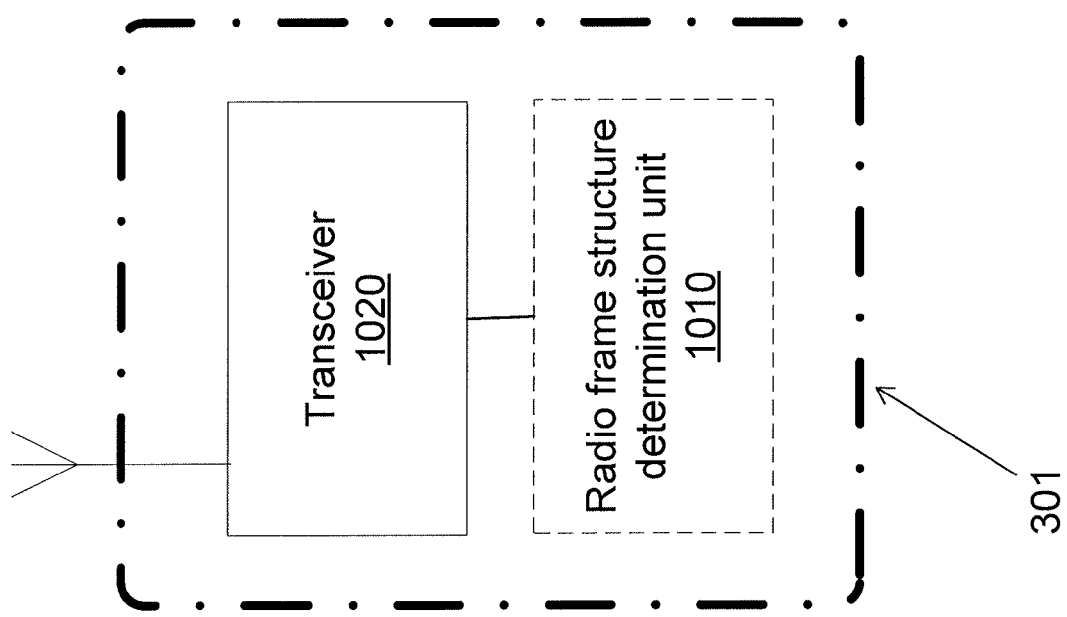
FIG. 10 is a block diagram illustrating a structure of a UE according to the present disclosure.

As shown in FIG. 10, the UE 301 comprises a transceiver 1020, which is configured to perform transmission and reception in the mixed network 300 according to a radio frame structure, wherein the radio frame structure comprises at least one D2D subframe having a GP at an end or at a beginning of the D2D subframe. When the transceiver 1020 performs transmission and reception, the transceiver 1020 may also be described as communicating. Optionally, the UE 301 may further comprise a radio frame structure determination unit 1010 which may be configured to determine the radio frame structure as comprising at least one D2D subframe having a GP at the end or at the beginning of the D2D subframe.

In some embodiments, the radio frame structure comprises the D2D subframe having the GP at its beginning, in a case where the D2D subframe is to be transmitted, by the UE 301 to the D2D UE 303, after a cellular subframe and a timing advance for transmitting the cellular subframe, TA_cell, is shorter than a timing advance for transmitting the D2D subframe, TA_D2D.

In some embodiments, the radio frame structure comprises the D2D subframe having the GP at its end, in a case where a cellular subframe is to be transmitted by the UE 301 to the eNB 205, after the D2D subframe and a timing advance for transmitting the cellular subframe, TA_cell, is longer than or equal to a timing advance for transmitting the D2D subframe, TA_D2D.

In some embodiments, the radio frame structure comprises the D2D subframe having the GP at its beginning, in a case where the D2D subframe is to be received by the UE 301 from the D2D UE 303, after a cellular subframe is transmitted by the UE 301 to the eNB, and a timing advance for transmitting the cellular subframe, TA_cell, is shorter than a timing advance for transmitting the D2D subframe, TA_D2D, minus a transmission delay of the D2D subframe from D2D TX to D2D RX, T_TransDelay.

In some embodiments, the radio frame structure comprises the D2D subframe having the GP at its end, in a case where a cellular subframe is to be transmitted by the UE 301 to the eNB 305 after the D2D subframe is received by the UE 301 from the D2D UE 303, and a timing advance for transmitting the cellular subframe, TA_cell, is longer than or equal to a timing advance for transmitting the D2D subframe, TA_D2D, minus a transmission delay of the D2D subframe from D2D TX to D2D RX, T_TransDelay.

In some embodiments, the radio frame structure comprises a first D2D subframe followed by a second D2D subframe with the GP at the end of the first D2D subframe or the GP at the beginning of the second D2D subframe or the GP both at the end of the first D2D subframe and at the beginning of the second D2D subframe, in a case where the second D2D subframe is to be transmitted by the UE 301 to the D2D UE 303 after the first D2D subframe is received.

The GP may correspond to a duration of one OFDM symbol.

Preferably, the radio frame structure determination unit 1010 may be configured to determine the radio frame structure as comprising a D2D subframe having a GP at its beginning, in a case where the D2D subframe is to be transmitted by the UE 301 to the D2D UE 303 after a cellular subframe and a timing advance for transmitting the cellular subframe, TA_cell, is shorter than a timing advance for transmitting the D2D subframe, TA_D2D.

Preferably, the radio frame structure determination unit 1010 may be configured to determine the radio frame structure as comprising a D2D subframe having a GP at its end, in a case where a cellular subframe is to be transmitted by the UE 301 to the eNB 305, after the D2D subframe and a timing advance for transmitting the cellular subframe, TA_cell, is longer than or equal to a timing advance for transmitting the D2D subframe, TA_D2D.

Preferably, the radio frame structure determination unit 1010 may be configured to determine the radio frame structure as comprising a D2D subframe having a GP at its beginning, in a case where the D2D subframe is to be received by the UE 301 from the D2D UE 303, after a cellular subframe is transmitted by the UE 301 from the eNB 305, and a timing advance for transmitting the cellular subframe, TA_cell, is shorter than a timing advance for transmitting the D2D subframe, TA_D2D, minus a transmission delay of the D2D subframe from D2D TX to D2D RX, T_TransDelay.

Preferably, the radio frame structure determination unit 1010 may be configured to determine the radio frame structure as comprising a D2D subframe having a GP at its end, in a case where a cellular subframe is to be transmitted by the UE 301 to the eNB 305, after the D2D subframe is received by the UE 301 from the D2D UE 303, and a timing advance for transmitting the cellular subframe, TA_cell, is longer than or equal to a timing advance for transmitting the D2D subframe, TA_D2D, minus a transmission delay of the D2D subframe from D2D TX to D2D RX, T_TransDelay.

Preferably, the radio frame structure determination unit 1010 may be configured to determine the radio frame structure as comprising a first D2D subframe followed by a second D2D subframe with a GP at the end of the first D2D subframe and/or a GP at the beginning of the second D2D subframe, in a case where the second D2D subframe is to be transmitted by the UE 301 to the D2D UE 303, after the first D2D subframe is received by the UE 301 from the D2D UE 303.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A communication method performed by a User Equipment, UE, in a mixed cellular and Device-to-Device, D2D, network, the method comprising:
communicating in the mixed network according to a radio frame structure,
wherein the radio frame structure comprises a first D2D subframe followed by a second D2D subframe with a Guard Period, GP, at the end of the first D2D subframe when the second D2D subframe is to be transmitted after the first D2D subframe is received.

2. The method according to claim 1, further comprising: determining the radio frame structure as comprising at least one D2D subframe having a GP at the end or at the beginning of the at least one D2D subframe.

3. The method according to claim 1, wherein the radio frame structure comprises a D2D subframe having a GP at its beginning, when the D2D subframe is to be transmitted after a cellular subframe and where a timing advance for transmitting the cellular subframe, TA_cell, is shorter than a timing advance for transmitting the D2D subframe, TA_D2D.

4. The method according to claim 1, wherein the radio frame structure comprises a first D2D subframe followed by a second D2D subframe with a GP at the end of the second D2D subframe, when a cellular subframe is to be transmitted after the second D2D subframe, and where a timing advance for transmitting the cellular subframe, TA_cell, is longer than or equal to a timing advance for transmitting the second D2D subframe, TA_D2D.

5. The method according to claim 1, wherein the radio frame structure comprises a D2D subframe having a GP at its beginning, when the D2D subframe is to be received after a cellular subframe is transmitted and where a timing advance for transmitting the cellular subframe, TA_cell, is shorter than a timing advance for transmitting the D2D subframe, TA_D2D, minus a transmission delay of the D2D subframe from D2D TX to D2D RX, T_TransDelay.

6. The method according to claim 1, wherein the radio frame structure comprises a first D2D subframe followed by a second D2D subframe with a GP at the end of the second D2D subframe, when a cellular subframe is to be transmitted after the second D2D subframe is received and when a timing advance for transmitting the cellular subframe, TA_cell, is longer than or equal to a timing advance for transmitting the second D2D subframe, TA_D2D, minus a transmission delay of the second D2D subframe from D2D TX to D2D RX, T_TransDelay.

7. The method according to claim 1, wherein the GP corresponds to a duration of one Orthogonal Frequency Division Multiplexing, OFDM, symbol.

8. A User Equipment, UE, in a mixed cellular and Device-to-Device, D2D, network, comprising:
- a transceiver configured to perform transmission and reception in the mixed network according to a radio frame structure,
- wherein the radio frame structure comprises a first D2D subframe followed by a second D2D subframe with a Guard Period, GP, at the end of the first D2D subframe when the second D2D subframe is to be transmitted after the first D2D subframe is received.

9. The UE according to claim 8, further comprising:
- a radio frame structure determination unit configured to determine the radio frame structure as comprising at least one D2D subframe having a GP at the end or at the beginning of the at least one D2D subframe.

10. The UE according to claim 8, wherein the radio frame structure comprises a D2D subframe having a GP at its beginning, when the D2D subframe is to be transmitted after a cellular subframe and a timing advance for transmitting the cellular subframe, TA_cell, is shorter than a timing advance for transmitting the D2D subframe, TA_D2D.

11. The UE according to claim 8, wherein the radio frame structure comprises a first D2D subframe followed by a second D2D subframe with a GP at the end of the second D2D subframe, when a cellular subframe is to be transmitted after the D2D subframe and a timing advance for transmitting the cellular subframe, TA_cell, is longer than or equal to a timing advance for transmitting the D2D subframe, TA_D2D.

12. The UE according to claim 8, wherein the radio frame structure comprises a D2D subframe having a GP at its beginning, when the D2D subframe is to be received after a cellular subframe is transmitted and a timing advance for transmitting the cellular subframe, TA_cell, is shorter than a timing advance for transmitting the D2D subframe, TA_D2D, minus a transmission delay of the D2D subframe from D2D TX to D2D RX, T_TransDelay.

13. The UE according to claim 8, wherein the radio frame structure comprises a first D2D subframe followed by a second D2D subframe with a GP at the end of the second D2D subframe, when a cellular subframe is to be transmitted after the D2D subframe is received and a timing advance for transmitting the cellular subframe, TA_cell, is longer than or equal to a timing advance for transmitting the D2D subframe, TA_D2D, minus a transmission delay of the D2D subframe from D2D TX to D2D RX, T_TransDelay.

14. The UE according to claim 8, wherein the GP corresponds to a duration of one Orthogonal Frequency Division Multiplexing, OFDM, symbol.

* * * * *